(12) United States Patent
Tsuboi

(10) Patent No.: US 7,865,021 B2
(45) Date of Patent: Jan. 4, 2011

(54) COMPRESSED STREAM DECODING APPARATUS AND METHOD

(75) Inventor: Eiji Tsuboi, Kanagawa (JP)

(73) Assignee: NEC Electronics Corporation, Kawasaki, Kanagawa (JP)

( * ) Notice: Subject to any disclaimer, the term of this patent is extended or adjusted under 35 U.S.C. 154(b) by 1437 days.

(21) Appl. No.: 11/287,363

(22) Filed: Nov. 28, 2005

(65) Prior Publication Data

US 2006/0120462 A1    Jun. 8, 2006

(30) Foreign Application Priority Data

Dec. 6, 2004    (JP)    ............................. 2004-352529

(51) Int. Cl.
G06K 9/36    (2006.01)
G06K 9/46    (2006.01)
H04N 7/12    (2006.01)
H04N 11/02   (2006.01)

(52) U.S. Cl. ....................... 382/232; 382/236; 382/238; 382/239; 375/240.01

(58) Field of Classification Search ................. 375/240, 375/240.01; 382/232, 236, 238, 239
See application file for complete search history.

(56) References Cited

U.S. PATENT DOCUMENTS

| | | | | |
|---|---|---|---|---|
| 5,784,119 | A * | 7/1998 | Noda et al. .................. | 348/512 |
| 5,808,722 | A * | 9/1998 | Suzuki ........................ | 352/12 |
| 5,832,256 | A * | 11/1998 | Kim ........................... | 713/501 |
| 6,181,746 | B1 | 1/2001 | Hoshi | |
| 6,313,879 | B1 * | 11/2001 | Kubo et al. ................. | 348/512 |
| 6,430,361 | B2 * | 8/2002 | Lee ............................. | 386/98 |
| 6,477,204 | B1 * | 11/2002 | Fukushima et al. ..... | 375/240.28 |
| 6,516,138 | B2 * | 2/2003 | Kashiwagi et al. .......... | 386/126 |
| 6,931,071 | B2 * | 8/2005 | Haddad et al. ......... | 375/240.28 |
| 7,257,135 | B2 * | 8/2007 | Sugahara ..................... | 370/535 |
| 7,369,614 | B2 * | 5/2008 | Moutin .................. | 375/240.28 |
| 7,533,402 | B2 * | 5/2009 | Demas et al. ................. | 725/71 |

(Continued)

FOREIGN PATENT DOCUMENTS

JP    9-205651    8/1997

(Continued)

OTHER PUBLICATIONS

Japanese Action dated Sep. 1, 2009 with partial English language translation.

*Primary Examiner*—Aaron W Carter
*Assistant Examiner*—Utpal Shah
(74) *Attorney, Agent, or Firm*—McGinn IP Law Group, PLLC

(57) ABSTRACT

A compressed stream decoding apparatus to preventing a disturbance of a display image is disclosed. The compressed stream decoding apparatus includes: a first video data processor decoding an input first compressed video stream based on first reference time information added to the first compressed video stream, and outputting decoded video data based on the first reference time information; and a second video data processor performing alternatively a first processing and a second processing, wherein the first processing is decoding an input second compressed video stream based on second reference time information added to the second compressed video stream and outputting decoded video data based on the second reference time information; and the second processing is outputting the decoded video data decoded by the first video data processor based on the first reference time information.

28 Claims, 7 Drawing Sheets

U.S. PATENT DOCUMENTS

2005/0117654 A1* 6/2005 Im .................. 375/240.26

FOREIGN PATENT DOCUMENTS

| JP | 11-187396 | 7/1999 |
| JP | 2001-197048 | 7/2001 |
| JP | 2001-309371 | 11/2001 |
| JP | 3356078 | 10/2002 |

* cited by examiner

COMPRESSED STREAM DECODING APPARATUS AND METHOD

BACKGROUND OF THE INVENTION

1. Field of the Invention

The present invention relates to a compressed stream decoding apparatus for decoding plural compression-coded video streams. In particular, the invention relates to a compressed stream decoding apparatus and method capable of decoding plural compressed video streams and outputting plural picture images.

2. Description of Related Art

In digital broadcasting services such as BS digital broadcasting, CS digital broadcasting, and digital terrestrial broadcasting services, an MPEG-2<transport stream has been used. The MPEG-2 transport stream can adopt such a configuration that plural programs are multiplexed in one transport stream.

Up to now, apparatuses for separating plural programs in the MPEG-2 transport stream and decoding plural compressed video streams in the plural programs have been proposed (see Japanese Unexamined Patent Publication No. 11-187396, for example). According to the apparatuses, for example, it is possible to receive the digital broadcasting service to watch or listen to one program while recording the program or another program or to split a display screen into plural areas and display plural programs on the split areas at a time.

FIG. 7 shows the configuration of a conventional compressed stream decoding apparatus capable of decoding plural compressed video streams in plural programs in this way. A compressed stream decoding apparatus 70 receives two transport streams TS1 and TS2 to decode a compressed video stream in one program separated from the transport stream TS1 and output an image from a display output unit 112 as an output image 1. Likewise, a compressed video stream in one program separated from the transport stream TS2 is decoded to output an image from a display output unit 132 as an output image 2.

Further, in the compressed stream decoding apparatus 70, a PLL (phase locked loop) circuit including a comparator 104, a low-pass filter (LPF) 105, a voltage controlled oscillator (VCO) 106, and an STC counter 103 generates a system clock CLK1 synchronous with a PCR (program clock reference) as reference time information extracted from the transport stream TS1. The generated system clock CLK1 is used for determining a decoding timing for a program separated from the transport stream TS2 as well as the transport stream TS1 and for determining an image output timing.

In the compressed stream decoding apparatus 70, if the transport streams TS1 and TS2 are different, different bit rates are used for encoding the respective streams. For example, an STC (system time clock) as a reference clock for encoding and decoding based on the MPEG-2 standard has a tolerance of ±1350 Hz with respect to a reference frequency of 27 MHz. As a result, the STC for encoding programs may vary within tolerance limits in some cases.

In the conventional compressed stream decoding apparatus 70 of FIG. 7, a clock CLK1 after clock recovery from the transport stream TS1 is used by a second compressed video stream processor 72 to decode the transport stream TS2. Thus, the STC for decoding the transport stream TS2 is different from the STC used for encoding the same. In such a case, in the second compressed video stream processor 72, there is a difference between a bit rate for storing video data of a program separated with a DEMUX 121 in an input buffer 127 and a bit rate for decoding the video data in the input buffer 127 with a decoder 128. This difference causes overflow or underflow of the input buffer 127, with the result that the output image 2 is repeated or skipped.

As mentioned above, the conventional compressed stream decoding apparatus has a problem that in the case of decoding plural compressed video streams to output plural picture images, a disturbance occurs in a display image due to skipping/repeating.

SUMMARY OF THE INVENTION

The present invention has been accomplished in view of the aforementioned problems, and it is accordingly an object of the present invention to provide a compressed stream decoding apparatus capable of decoding plural compressed video streams to output plural video pictures, and preventing a disturbance of a display image due to skipping/repeating in the case of outputting different picture images.

A compressed stream decoding apparatus according to an aspect of the invention includes: a first video data processor decoding an input first compressed video stream based on first reference time information added to the first compressed video stream, and outputting decoded video data based on the first reference time information; and a second video data processor performing alternatively a first processing and a second processing, wherein the first processing is decoding an input second compressed video stream based on second reference time information added to the second compressed video stream and outputting decoded video data based on the second reference time information; and the second processing is outputting the decoded video data decoded by the first video data processor based on the first reference time information.

With such a configuration, in the compressed stream decoding apparatus capable of decoding plural compressed video streams to output plural picture images, upon outputting plural difference video images, the video data can be decoded and output based on the reference time information (PCR) added to the compressed video stream, so a disturbance is prevented from occurring in a display image due to skipping/repeating. Moreover, in the case of outputting the same video images, the same images can be output based on the display synchronized signal generated using the reference time information (PCR) of the compressed video stream including a target image. Hence, it is possible to prevent a disturbance in the display image in the case of outputting the same picture images.

It is preferable for the second video data processor to comprise a selector selecting a first decoded video data decoded by the first video data processor or a second decoded video data decoded by the second video data processor. With such a configuration, an operation of circuits which perform processing from decoding the second compressed video stream to inputting the second decoded video data into the selector is stopped in case that the selector selects the first decoded video data, so a electric power consumption of the compressed stream decoding apparatus is reduced.

A compressed stream decoding apparatus according to another aspect of the invention includes: a decoder receiving a first compressed video stream and a second compressed video stream to decode the first compressed video stream and the second compressed video stream in a time-division manner, and outputting decoded video data; a first output buffer storing video data decoded with the first compressed video stream output from the decoder; a first display output unit outputting the video data stored in the first output buffer in sync with a display synchronized signal generated based on reference time information added to the first compressed video stream; a second output buffer storing video data obtained by decoding the second compressed video stream output from the decoder; and a second display output unit selecting one of the video data stored in the first output buffer and the video data stored in the second output buffer to output the selected video data. Further, the second display output unit outputs the video data stored in the first output buffer in sync with the display synchronized signal generated using the first reference time information, and outputs the video data stored in the second output buffer in sync with the display synchronized signal generated using the second reference-time information.

A compressed stream decoding method according to still another aspect of the invention includes: decoding an input first compressed video stream based on first reference time information added to the first compressed video stream, and storing decoded video data in a first output buffer; outputting the video data stored in the first output buffer in sync with a display synchronized signal generated using the first reference time information; decoding an input second compressed video stream based on second reference time information added to the second compressed video stream to store decoded video data in a second output buffer; and selecting one of the video data stored in the first output buffer and the video data stored in the second output buffer to output the selected video data from the second display output unit. Further, the second display output unit outputs the video data stored in the first output buffer in sync with the display synchronized signal generated using the first reference time information, and outputs the video data stored in the second output buffer in sync with the display synchronized signal generated using the second reference time information.

According to the apparatus and method of the invention, in the compressed stream decoding apparatus capable of decoding plural compressed video streams to output plural pictures images, upon outputting plural difference video images, the video data can be decoded and output based on the reference time information (PCR) added to the compressed video stream, so a disturbance is prevented from occurring in a display image due to skipping/repeating. Moreover, in the case of outputting the same video images, all the display output units for outputting the same images execute output operation based on the reference clock corresponding to the compressed video streams including the output images and the display synchronized signal generated using the reference time information. Hence, it is possible to prevent a disturbance in the display image.

A compressed stream decoding apparatus according to still another aspect of the invention decodes an input first compressed video stream and an input second compressed video stream in a time-division manner to output decoded video data, the apparatus adjusting, if the first compressed video stream and the second compressed video stream have different frame frequencies, a decoding start time such that a decoding start time of a picture in one of the compressed video streams with a lower frame frequency is delayed until completion of decoding of a picture in the other video stream with a higher frame frequency.

With such a configuration, in the case of decoding two compressed video streams with different frame frequencies in a time-division manner, the image can be displayed with no delay of both the compressed video streams. Therefor, the disturbance in the display image resulting from the decoding delay can be prevented.

According to the present invention, it is possible to provide a compressed stream decoding apparatus capable of decoding plural compressed video streams and outputting plural video pictures, and preventing a disturbance of a display screen due to skipping/repeating in the case of outputting different picture images and in the case of outputting the same picture image several times.

Furthermore, in a case of outputting plural same images, operations of at least part of circuits comprised in the compressed stream decoding apparatus can be stopped, so it is possible to reduce a power consumption of the compressed stream decoding apparatus.

BRIEF DESCRIPTION OF THE DRAWINGS

The above and other objects, advantages and features of the present invention will be more apparent from the following description taken in conjunction with the accompanying drawings, in which.

DESCRIPTION OF THE PREFERRED EMBODIMENTS

The invention will be now described herein with reference to illustrative embodiments.

First Embodiment

Figure 1:
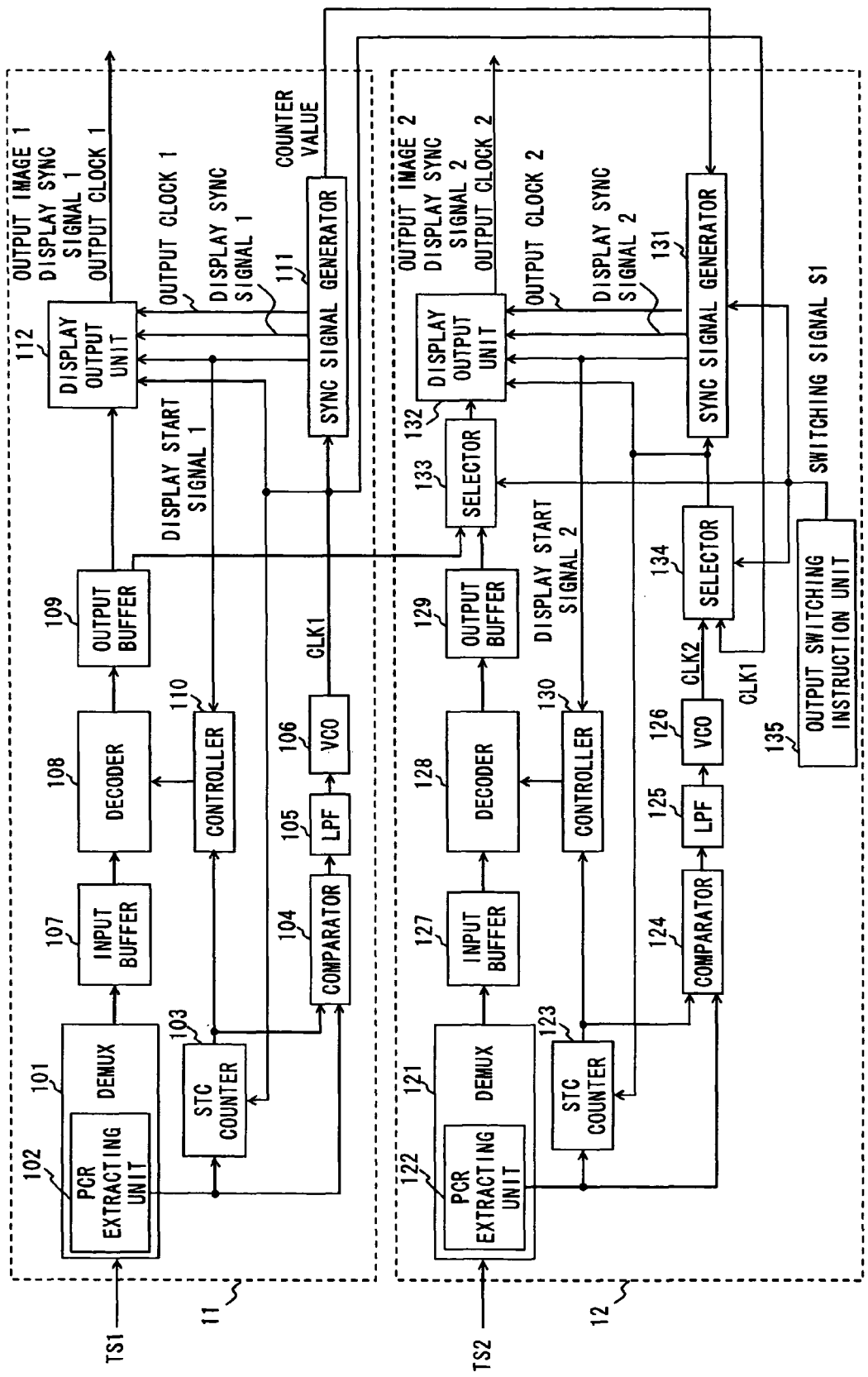
FIG. 1 is a diagram showing a compressed video stream decoding apparatus according to an embodiment of the present invention.

Referring to FIG. 1, the configuration and operation of a compressed stream decoding apparatus 10 according to a first embodiment of the present invention are described. The compressed stream decoding apparatus 10 decodes a compressed video stream multiplexed with an MPEG-2 transport stream. To begin with, a first compressed video stream processor 11 for decoding a compressed video stream multiplexed with a transport stream TS1 to output an image as an output image 1 is described.

A DEMUX 101 separates one program from the transport stream TS1 multiplexed with one or more programs with reference to PID (packet identifier), and stores compressed video data in the separated program in an input buffer 107. The input buffer 107 is a memory storing the compressed video data separated with the DEMUX 101. A capacity of the input buffer 107 may be set to a value not less than Video_Buffer capacity conforming to the MPEG-2 standard in accordance with a type of the compressed video data in the transport stream TS1 (more specifically, profile and level based on the MPEG-2 standard).

In response to a display start signal 1, a controller 110 acquires a value of the STC counter 103 and instructs a decoder 108 to decode a picture given a DTS (decoding time stamp) value smaller than the obtained STC value.

The decoder 108 acquires the picture given the DTS value smaller than the STC value obtained with the controller 110 from the input buffer 107 and decodes the picture to store decoded video data (picture) in an output buffer 109.

The output buffer 109 is a memory storing plural decoded pictures (video data). The reason for storing the plural pictures is that pictures composing the MPEG-2 compressed video stream include a B picture created through inter-picture predictive coding using two pictures, previous and subsequent ones, so the decoding order represented as a DTS value may be different from the reproducing order represented as a PTS (presentation time stamp), and thus pictures decoded in advance should be stored to wait for their turn. More specifically, as disclosed in Japanese Patent No. 3356078, for example, four frame memories may constitute the memory so as to store four pictures.

A synchronized signal generator 111 multiplies or demultiplies the system clock CLK1 synchronized with the STC of the program as a decoding target to generate an output clock 1. The output clock 1 indicates an output timing on a pixel basis of the output image, which is a so-called dot clock. For example, if the output image is an HDTV video signal (1081i), dot clocks of 74.25/1.001 MHz are generated; if the output image is an NTSC video signal (480i), dot clocks of 13.5 MHz are generated. Further, the synchronized signal generator 111 includes a counter for determining an output timing on the basis of pixel of the output image in sync with the output clock 1. When the counter value reaches a value corresponding to the end of a frame (picture) or scanning line (line), the display start signal 1 and a display synchronized signal 1 are generated. In this example, the display start signal 1 is a signal notifying the controller 110 of a display start timing on a picture basis. The controller 110 acquires the STC value at a timing determined with the display start signal 1 and instructs the decoder 108 to start decoding. On the other hand, the display synchronized signal 1 is also a signal indicating a vertical scanning period or horizontal scanning period, more specifically, a vertical synchronized signal indicating a vertical blanking timing based on a waveform change on the basis of vertical scanning period (Vsync) and a horizontal synchronized signal indicating a horizontal blanking timing based on a waveform change on the basis of horizontal scanning period (Hsync).

The display output unit 112 acquires decoded video data from the output buffer 109 based on the display start signal 1 from the synchronized signal generator 111 to be output in accordance with the output clock 1 and the display synchronized signal 1. The display output unit 112 outputs data to a display device displaying video data such as a CRT display, and a recording device for recording the video data such as a hard disk drive or DVD drive. The display output unit 112 may output the digital video signal as it is or the video signal in the form of analog video signal such as an NTSC signal depending on a target device.

Next, an operation of generating a system clock of 27 MHz compliant with the STC as an MPEG-2 reference time is mentioned. A PCR extracting unit 102 separates a PCR value corresponding to the compressed video stream separated with the DEMUX 101 from the transport stream TS1 to output the resultant to the STC counter 103 and the comparator 104. The PCR is a time stamp generated with a STC frequency (27 MHz), and indicates the STC on a transmission side of the encoded compressed video stream.

The STC counter 103 receives the PCR value from the PCR extracting unit 102 and sets a count value to the received PCR value. After that the STC counter 103 increments the count value in accordance with the system clock CLK1 output from a VCO 106.

The comparator 104 for comparing the PCR value with the count value of the STC counter 103, the low-pass filter (LPF) 105, and the voltage control oscillator (VCO) 106 for generating a system clock constitute the PLL (Phase Locked Loop) circuit. In the comparator 104, a difference between the PCR value and the count value of the STC counter 103, which counts in sync with the output from the VCO 106 is detected and reflected to the output from the VCO 106. As mentioned above, the PCR value is a count value indicative of the STC as a reference time used for encoding on the transmission side of the compressed video stream. Hence, the clock is generated with reference to the PCR value, making it possible to output the system clock synchronous with the STC on the transmission side of the compressed video stream.

Next, a second compressed video stream processor 12 for decoding a compressed video stream multiplexed with the transport stream TS2 to output an image as an output image 2 is described. A DEMUX 121, a PCR extracting unit 122, an STC counter 123, a comparator 124, an LPF 125, a VCO 126, an input buffer 127, a decoder 128, an output buffer 129, a controller 130, a synchronized signal generator 131, and a display output unit 132, which are provided for separating and decoding a program multiplexed with the transport stream TS2 to output an image as the output image 2, have the same functions as corresponding components of the first compressed video stream processor 11 (from the DEMUX 101 to the display output unit 112). Components having functions different from those of the components of the first compressed video stream processor 11 are described below.

A selector 133 selects data stored in the output buffer 109 or 129 as image data output from the display output unit 132. A selector 134 selects CLK1 or CLK2 as a system clock used as a reference for a synchronized signal generator 131 to generate an output clock 2. The CLK1 is a clock generated in sync with the PCR of the compressed data stream separated with the DEMUX 101 of the first compressed video stream processor 11, and the CLK2 is a system clock generated in sync with the PCR of a program separated with the DEMUX 121 of the second compressed video stream processor 12.

An output switching instruction unit 135 receives a signal instructing the switching of the output image of a display output unit from an external CPU or the like to output an output switching signal S1 to the synchronized signal generator 131, the selector 133, and the selector 134 in accordance with the signal.

Next, an operation of switching the output image of the display output unit 132 according to this embodiment compressed stream decoding apparatus 10 is described. First, an operation of sending different output images corresponding to the transport streams TS1 and TS2 to the display output units 112 and 132, respectively. In this case, the synchronized signal generator 111 of the first compressed video stream processor 11 generates an output clock 1, a display synchronized signal 1, and a display start signal 1 in response to the system clock CLK1 from the VCO 106, and the synchronized signal generator 131 of the second compressed video stream processor 12 generates a output clock 2, display synchronized signal 2, and a display start signal 2 in response to a system clock CLK2 from a VCO 126.

Thus, the first compressed video stream processor 11 can execute decoding and image output in accordance with the system clock CLK1 synchronous with the STC which was used for encoding the compressed video stream separated from the transport stream TS1. On the other hand, the second compressed video stream processor 12 can execute the decoding and image output in accordance with the system clock CLK2 synchronous with the STC for encoding the compressed video stream separated from the transport stream TS2. Thus, the first compressed video stream processor 11 and the second compressed video stream processor 12 independently execute the decoding and image output in accordance with appropriate system clocks, so the output image is by no means skipped/repeated.

Next, description is given of an operation of switching a state for decoding compressed video streams from transport streams TS1 and TS2 and outputting the decoded ones to a state for receiving one transport stream TS1 to send the same output image to the display output unit 112 and the display output unit 132.

Receiving the signal instructing the switching of an output image of the display output unit from an external CPU, the output switching instruction unit 135 outputs a output switching signal S1 to the synchronized signal generator 131, and the selectors 133 and 134 for switching the output image 2 of the display output unit 132 in accordance with the received signal. The selector 134 having received the output switching signal S1 selects and outputs the clock CLK1 output from the VCO 106 to the STC counter 123, the synchronized signal generator 131, and the display output unit 132. The synchronized signal generator 131 having received the output switching signal S1 obtains a count value of the synchronized signal generator 111 to update its own count value. In this way, the system clock input to the synchronized signal generators 111 and 131, and the display synchronized signal 1 generated with the synchronized signal generator 111 and the display synchronized signal 2 generated with the synchronized signal generator 131 can be synchronized. Further, the data stored in the output buffer 109 is output to the display output unit 132 as an output image through the selector 133 having received output switching signal S1.

Figure 2:
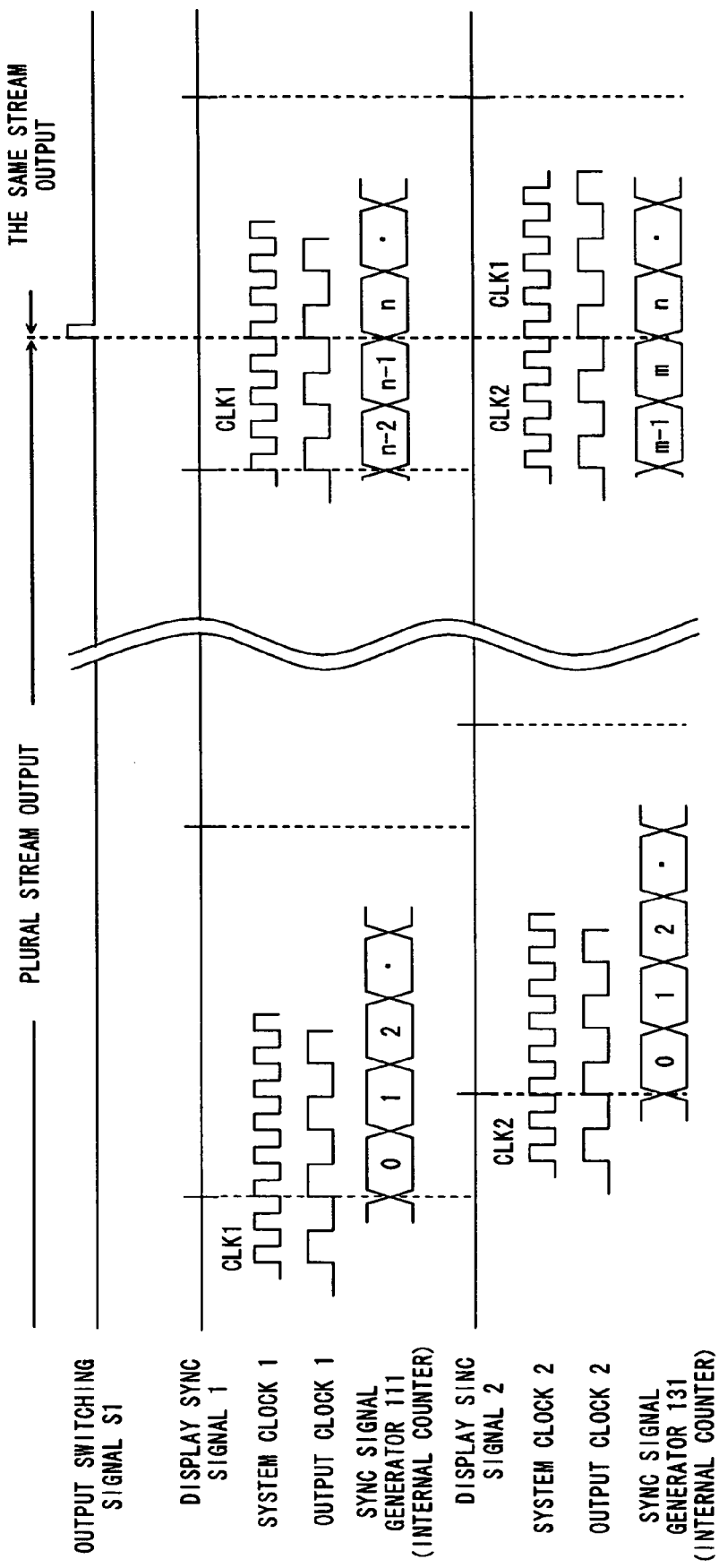
FIG. 2 is a timing chart illustrative of an operation of the compressed video stream decoding apparatus according to the embodiment of the present invention.

FIG. 2 is a timing chart of timings when the state of outputting plural streams is changed to the state of outputting the same stream. In the state of outputting plural streams, the synchronized signal generator 111 and the synchronized signal generator 131 increments internal counters based on different reference clocks, CLK1 and CLK2 to generate the display synchronized signal and the output clock, so the signal generated with the synchronized signal generator 111 is out of sync with the signal generated with the synchronized signal generator 131. As a result, neither overflow nor underflow occurs in the input buffers 107 and 108 to prevent the disturbance of the display image due to skipping/repeating.

On the other hand, upon switching to the state of outputting the same stream, the selector 134 selects the CLK1 in accordance with the output switching signal S1, and the synchronized signal generator 131 obtains a count value of the synchronized signal generator 111. Hence, after the reception of the output switching signal, the output clock 2 and the display synchronized signal 2 generated with the synchronized signal generator 131 are in sync with the output clock 1 and the display synchronized signal 1 generated with the synchronized signal generator 111.

Figure 3:
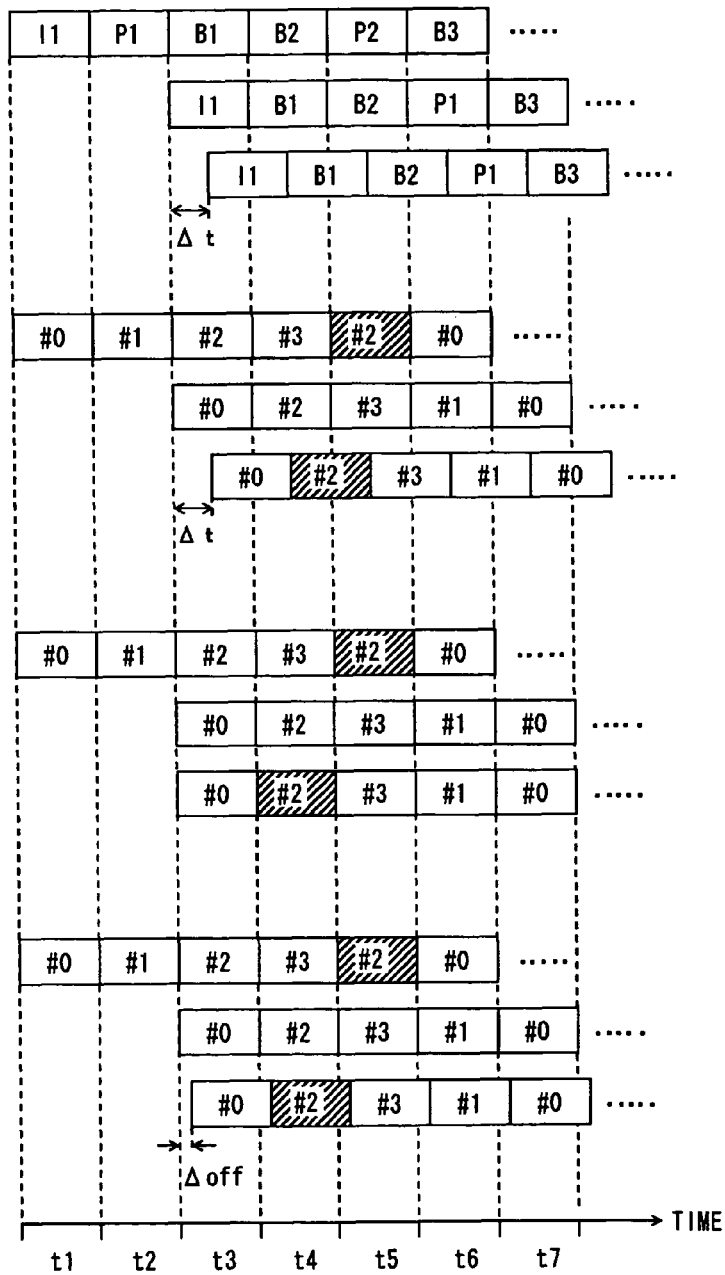
FIG. 3 is a timing chart illustrative of an operation of the compressed video stream decoding apparatus according to the embodiment of the present invention.

Referring now to FIG. 3, description is given of a problem that arises when in the state of outputting the same stream, the display synchronized signal 1 generated with the synchronized signal generator 111 does not match the display synchronized signal 2 generated with the synchronized signal generator 131. The portion (a) of FIG. 3 shows a decoding timing of the decoder 108, and output timing for the picture decoded with the decoder 108 in the display output units 112 and 132. In the portion (a), 11 represents an I picture, P1 and P2 represent P pictures, and B1 to B3 represent B pictures. Unless the display synchronized signal 1 generated with the synchronized signal generator 111 matches with the display synchronized signal 2 generated with the synchronized signal generator 131, operational clocks of the display output unit 112 and the display output unit 132 is out of sync, resulting in a difference $\Delta t$ between an output timing of the display output unit 112 and an output timing of the display output unit 132.

On the other hand, a portion (b) of FIG. 3 shows a writing/reading timing for the output buffer 109 when the decoding and image output are executed at the timings of the portion (a) of FIG. 3. In the portion (b), #0 to #3 denote frame memory number in the case where the output buffer 109 includes four frame memories so as to store four pictures. The decoder 108 should write any data to a frame memory from which the display output units 112 and 132 have read data. The decoder 108 and the display output unit 112 access the output buffer 109 based on the same display start signal 1 generated with the synchronized signal generator 111. Hence, a writing processing of the decoder 108 never conflicts with a reading processing of the display output unit 112; for example, the decoder 108 writes any data at time t5 to a frame memory #2 from which the display output unit 112 has read data at time t4. It is because the writing/reading processings of the decoder 108 and the display output unit 112 to/from the output buffer 109 are carried out at frame intervals for each picture, and the writing or reading start timings are synchronized. With the above configuration, the usability of the frame memory improves and the number of frame memories in the output buffer 109 can be minimized.

However, the decoder 108 and the display output unit 132 access the output buffer 109 based on the different signals, the display start signals 1 and 2 generated with the synchronized signal generators 111 and 131, respectively. Therefore, the writing start timing of the decoder 108 and the reading start timing of the display output unit 132 with respect to the output buffer 109 are out of sync. As a result, as shown in the portion (b) of FIG. 3, if there is a difference $\Delta t$ between the writing start timing of the decoder 108 and the reading start timing of the display output unit 132 with respect to the output buffer 109, which means that, for example, the decoder 108 writes any data at time t5 to the frame memory #2, from which the display output unit 132 has not yet read data, the writing processing of the decoder 108 conflicts with the reading processing of the display output unit 132.

As mentioned above, if the writing processing and reading processing with respect to the output buffer 109 conflict with each other, the image data to be output is deleted to output an erroneous image, leading to a disturbance of the output image of the display output unit 132.

In the state of outputting the same stream according to this embodiment compressed stream decoding apparatus 10, the synchronized signal generators 111 and 131 generate the display synchronous signals 1 and 2 based on the common system clock CLK1 corresponding to the PCR of the compressed video stream separated from the transport stream TS1. Further, the synchronized signal generator 131 obtains the count value from the synchronized signal generator 111 to update its own count value. As a result, the display synchronous signals 1 and 2, more specifically, output cycles of the vertical scanning signal (Vsync) and horizontal scanning signal (Hsync), can be in phase.

With such configuration and operation, according to this embodiment compressed stream decoding apparatus 10, the timing at which the display output unit 132 accesses the output buffer 109 can match with the access timing of the display output unit 112. Further, frame periods determined by the output cycles of the vertical scanning signal (Vsync) and horizontal scanning signal (Hsync) match each other, so the timings at which the writing and reading data to/from the output buffer 109 are completed are synchronized. Thus, no confliction of the output buffer 109 occurs, so the same images can be output without causing the disturbance of the display image. The portion (c) of FIG. 3 shows how a phase for the reading processing of the display output unit 132 matches with a phase for the writing processing of the decoder 108.

According to this embodiment compressed stream decoding apparatus 10, the system clock is switched to CLK1 to be input to the synchronized signal generator 131, and the count value of the synchronized signal generator 111 is taken in the synchronized signal generator 131, by which the display synchronized signal 2 and the output clock 2 for the display output unit 132 are synchronized with the display synchronized signal 1 and the output clock 1 for the display output unit 112. However, in order to attain beneficial effects of the present invention, the display output unit 112 and the display output unit 132 need only to operate in accordance with the same display synchronized signal and the output clock. Accordingly, for example, in the case of outputting the same streams, the display output unit 132 may operate in accordance with the display synchronized signal 1 and the output clock 1 from the synchronized signal generator 111.

Further, in the case of outputting the same image data from the display output units 112 and 132, the compressed stream decoding apparatus 10 can suspend the operation of the subsequent-stage DEMUX 121, input buffer 127, decoder 128, and output buffer 129, saving power consumption.

Second Embodiment

Figure 4:
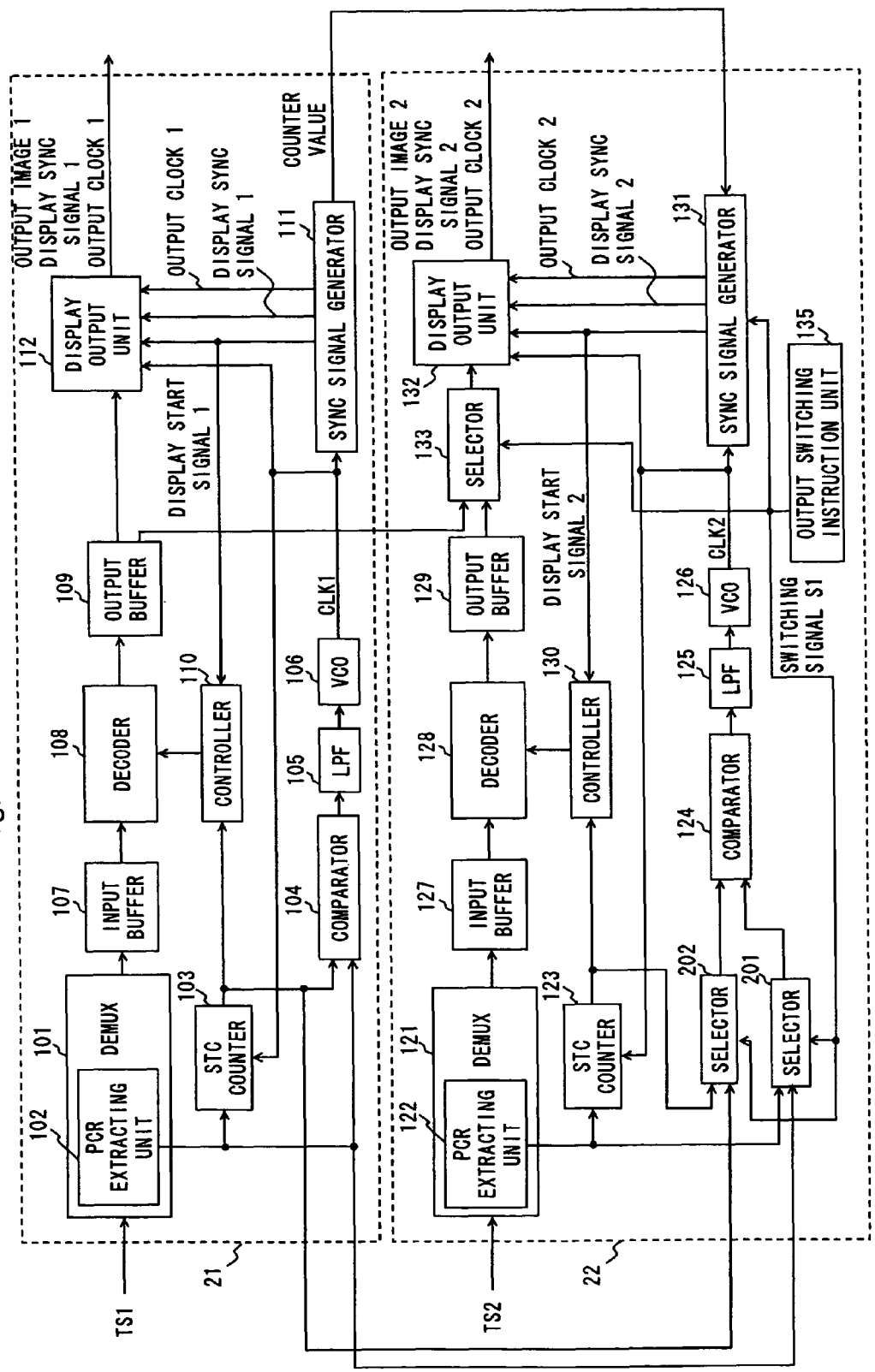
FIG. 4 is a diagram showing a compressed video stream decoding apparatus according to another embodiment of the present invention.

Referring to FIG. 4, the operation and the construction of a compressed stream decoding apparatus 20 according to this embodiment are described. The aforementioned compressed stream decoding apparatus 10 according to the first embodiment is different from the compressed stream decoding apparatus 20 in that the compressed stream decoding apparatus 10 selects the output of the VCO 106 or VCO 126 by use of the selector 134, while the compressed stream decoding apparatus 20 selects a PCR value and a STC counter value to be input to the comparator 124 by use of selectors 201 and 202, so the system clocks of the synchronized signal generator 111 and the synchronized signal generator 131 are synchronized in the case of outputting the same stream. The other components are the same as those of the compressed stream decoding apparatus 10 according to the first embodiment and denoted by like reference numerals, so their detailed description is omitted here.

In the compressed stream decoding apparatus 20, upon outputting the same stream, the selectors 201 and 202 operate in response to the output switching signal S1 to input the PCR value extracted with the PCR extracting unit 102 and the STC value output from the STC counter 103 to the comparator 124. As a result, the CLK2 output from the VCO 126 is reproduced based on the same RCR value and STC value from the VCO 106, so both the clocks are almost synchronous. However, both clocks are not completely synchronous, and involve different jitters depending on the LPF and VCO characteristics. The following problem arises if the system clocks CLK1 and CLK2 are not completely synchronous due to the jitter as mentioned above.

In the same stream display state in which the display output unit 112 and the display output unit 132 displays the same image, as described in the first embodiment, despite efforts to completely match a phase of the display synchronized signal 2 generated by the synchronized signal generator 131 with a phase of the display synchronized signal 1 generated by the synchronized signal generator 111, the phases may be shifted due to clock jitters. If such unexpected phase shift occurs, the conflict between the wiring processing of the decoder 108 to the output buffer 109 and the reading processing of the display output unit 132 brings a situation that an erroneous image is outputted, or that an image cannot be outputted in some cases. Such unexpected phase shift may occur in the compressed stream decoding apparatus 10 according to the first embodiment. For example, the display synchronized signal 2 and the display start signal 2 generated with the synchronized signal generator 131 have jitter components, and a time difference occurs due to a wiring delay at the time that the synchronized signal generator 131 acquires a counter value from the synchronized signal generator 111.

Thus, it is preferred that the display synchronized signal 2 of the synchronized signal generator 131 is synchronized with the display synchronized signal 1 of the synchronized signal generator 111 with an offset based on the clock jitter of the CLK1 and CLK2 instead of completely synchronizing the phases. If the CLK1 is not completely in phase with the CLK2, the conflict of the output buffer 109 may occur. However, if the decoder 108 writes data to a area of the frame memory in the output buffer 109, from which the display output unit 132 has read data, from the top onward, no conflict of the output buffer 109 occurs on a pixel basis, enabling the reading/writing to/from the frame memory. Accordingly, even if there is a phase shift between the display synchronized signal 1 and the display synchronized signal 2 due to the clock jitter, an offset is set for the display synchronized signal 2 so that competition of accesses to the output buffer 109 on a pixel basis may not arise.

To be specific, when the synchronized signal generator 131 acquires the counter value output from the synchronized signal generator 111 and updates its own counter value, a predetermined offset is set for a phase of an updated signal with respect to a signal phase of the incremented counter value of the synchronized signal generator 111 to update its own counter value. The phase difference at this time may be set so as not to cause serious conflict between the writing processing and reading processing of the output buffer 109, even if the phase difference varies depending on the clock jitter. A portion (d) of FIG. 3 shows how a reading phase of the display output unit 132 is sync with the phase of a reading timing of the decoder 108 with an offset doff.

In the compressed stream decoding apparatus 10 according to the first embodiment, the clock signal to be input to the synchronized signal generator 131 is discontinuously switched from CLK2 to CLK1 upon the output switching. In contrast, in the compressed stream decoding apparatus 20, the synchronized signal generator 131 always receives a clock signal generated from the VCO 126, so the clock signal to be input to the synchronized signal generator 131 may be continuously switched even at the time of output switching.

Third Embodiment

Figure 5:
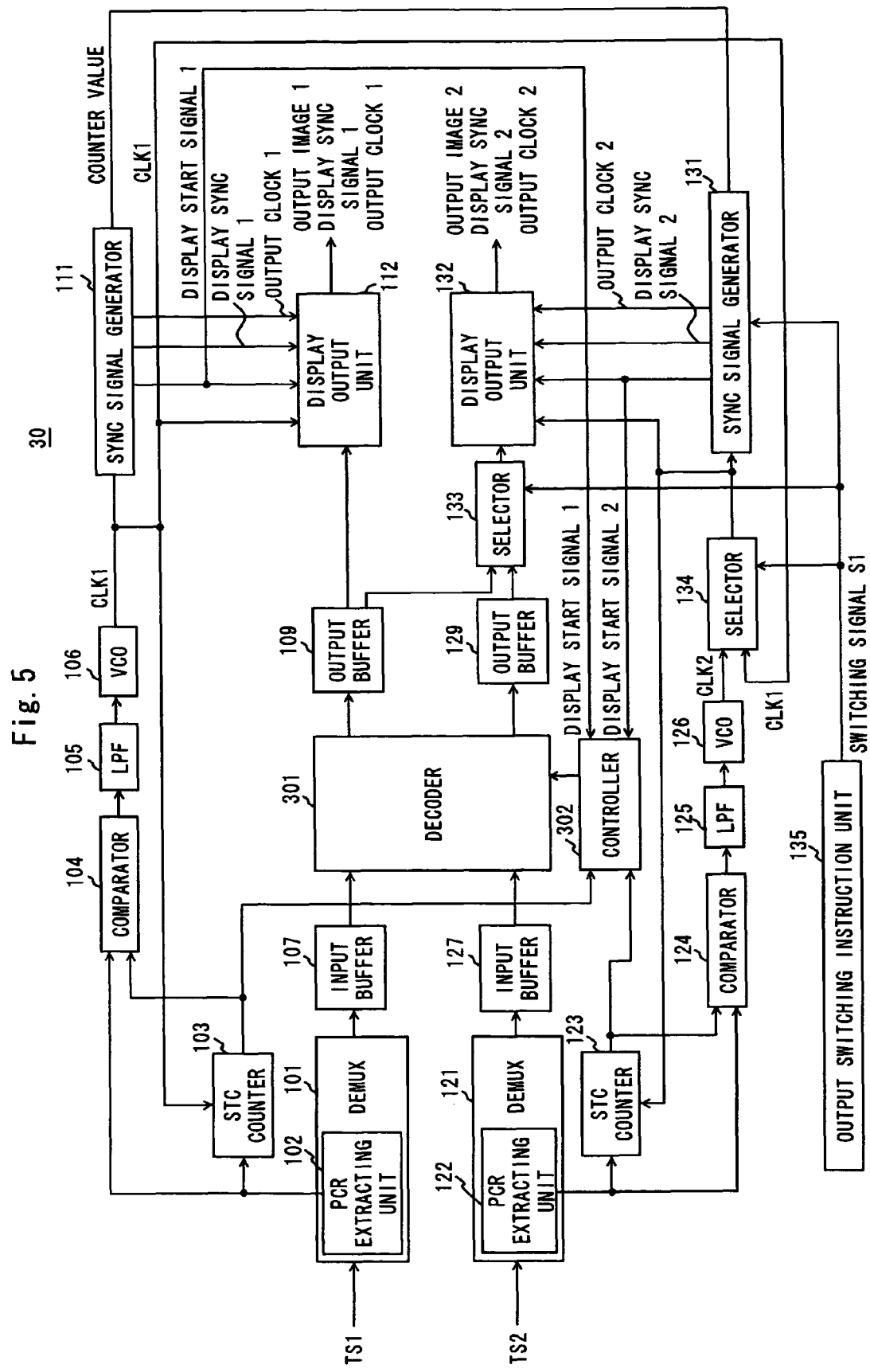
FIG. 5 is a diagram showing a compressed video stream decoding apparatus according to another embodiment of the present invention.

Referring to FIG. 5, the configuration and operation of the compressed stream decoding apparatus 30 according to this embodiment are described. A feature of the compressed stream decoding apparatus 30 is that the decoders 108 and 128 in the compressed stream decoding apparatus 10 according to the first embodiment are shared. The compressed stream decoding apparatus 30 has a decoder 301 and a controller 302. The decoder 301 decodes two compressed video streams through time-division processing. The controller 302 instructs the decoder 301 on a decoding timing. The other components are the same as the compressed stream decoding apparatus 10 according to the first embodiment of FIG. 1 and thus denoted by like reference numerals, and their detailed description is omitted here.

With such a configuration, the input signal of the selector 133 and the input signal of the selector 134 are switched in accordance with the output switching signal S1, and the counter value of the synchronized signal generator 131 is set, whereby a disturbance doesn't occur in the output image of the display output unit 132.

However, in the case of executing the decoding processing with one decoder 301 through time-division processing, a decoding processing of one compressed video stream is delayed until the decoding processing of the other compressed video stream is completed, and a disturbance occurs in a display image. This problem is described with reference to FIGS. 6A and 6B.

Figure 6A:
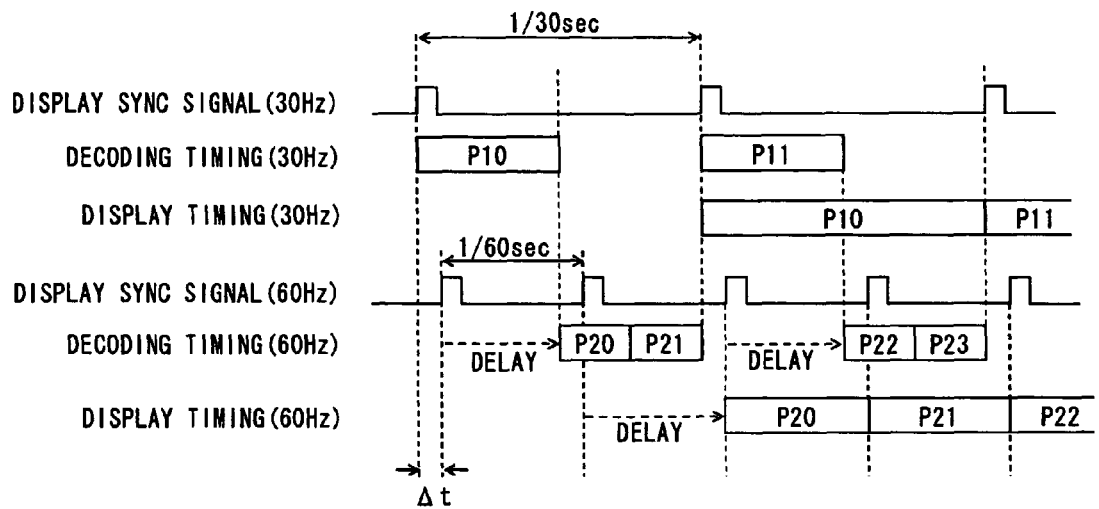
FIGS. 6A and 6B are timing charts illustrative of an operation of the compressed video stream decoding apparatus according to the embodiment of the present invention.
Figure 6B:
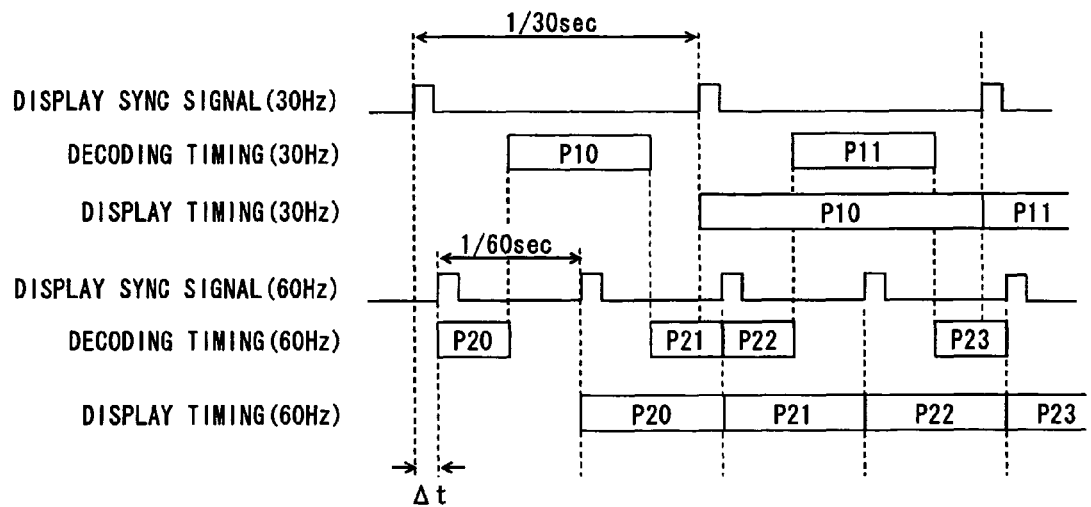
Figure 7:
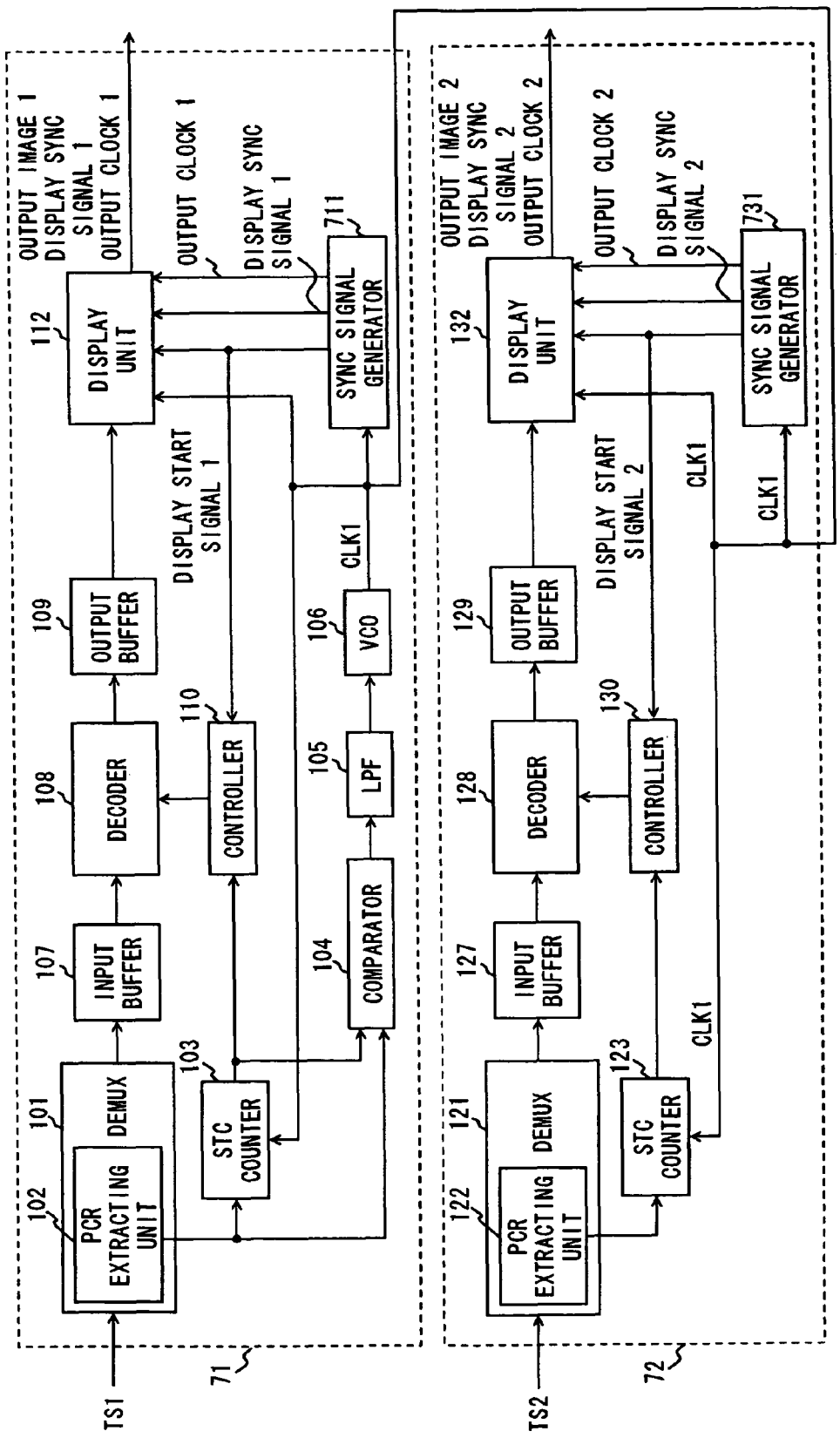
FIG. 7 is a diagram showing a conventional compressed video stream decoding apparatus.

FIG. 6A is a timing chart of an output timing for one compressed video stream with a frame frequency of 30 Hz and the other compressed video stream with a frame frequency of 60 Hz after the decoding processing through time-division processing. One frame period of the frame frequency of 30 Hz of the compressed video stream is 1/30 seconds, and one frame period of the frame frequency of 60 Hz of the compressed video stream is 1/60 seconds. Here, as shown in FIG. 6A, there is a difference $\Delta t$ between the display synchronized signal (Vsync) of the video stream of 30 Hz and the display synchronized signal (Vsync) of the video stream of 60 Hz. Further, each picture is decoded within one frame period represented by the display synchronized signal interval, and a display timing of the decoded picture falls within a frame following a decoded frame.

As shown in FIG. 6A, at the start of decoding a picture P10 of the frame frequency of 30 Hz where the decoding timing is reached in advance, a decoding start time of a picture P20 of the frame frequency of 60 Hz where the decoding timing is next reached is delayed until the decoding processing of the previous picture P10 is completed. This causes a delay in display timing of the picture P20 and a disturbance of a display image.

The problem that the disturbance occurs in the display image due to a delay of the decoding processing of the compressed video stream arises in the following case: when two compressed video streams of different frame frequencies are decoded in sync with reference clocks extracted from the respective compressed video streams, the two compressed video streams are decoded with one decoder through the time-division processing. That is, this problem arises in the case of displaying plural streams irrespectively of whether or not the state of displaying plural streams and the state of displaying the same stream are switched.

In order to solve the above problem, according to this embodiment compressed stream decoding apparatus 30, the controller 302 appropriately adjusts the decoding order and decoding timing of the pictures with the decoding unit 301. More specifically, at the start time of decoding the picture P10 of the frame frequency of 30 Hz, the decoding processing is not started, and the picture P20 of the frame frequency of 60 Hz is first decoded and then the picture P10 is decoded. For example, as shown in FIG. 6A, the decoding time of both the picture with the frame frequency of 60 Hz and the picture with the frame frequency of 30 Hz is within ½ of each frame period, the decoding start time of the picture P10 of the frame frequency of 30 Hz is delayed up to the middle of the display synchronized signal (Vsync) of the stream with the frame frequency of 60 Hz, and the picture P20 with the frame frequency of 60 Hz may be decoded first. Thus, the picture P20 with the frame frequency of 60 Hz can be decoded first irrespectively of the value of a difference $\Delta t$ between the display synchronized signal (Vsync) of the video stream of 30 Hz and the display synchronized signal (Vsync) of the video stream of 60 Hz.

Through such adjustment, within two frame periods (1/30 seconds) of the compressed video stream with the frame frequency of 60 Hz, two pictures of the frame frequency of 60 Hz (P20 and P21 of FIG. 6B) and one picture with the frame frequency of 30 Hz (P10 of FIG. 6B) can be decoded. Further, the decoding of one picture with the frame frequency of 30 Hz (P10 of FIG. 6B) is completed with in one frame period (1/30 seconds) of the compressed video stream with the frame frequency of 30 Hz, so two compressed video streams with the frame frequencies of 30 Hz and 60 Hz can be displayed with no delay.

The compressed stream decoding apparatus 30 according to this embodiment makes such adjustment that the decoding start time of the picture in one compressed video stream with a lower frame frequency is delayed until the decoding of the other compressed video stream with a higher frequency is completed, whereby even in the case of decoding two compressed video streams with different frame frequencies, the streams can be displayed with no delay of both the compressed video streams. Therefore, the disturbance of the display image resulting from the decoding delay as shown in FIG. 6A can be prevented.

Here, the decoding start time may be adjusted by the controller 302 based on the display start signal 1 and the display start signal 2 input from the synchronized signal generator 111 and 131. This is because the display start signal 1 and the display start signal 2 indicate a decoding start timing on a picture basis, and reflect the vertical scanning signal (Vsync) of video data as a decoding target.

In the first to third embodiments of the invention, for ease of explanation, the output of the image data decoded from two transport streams is switched, but the present invention is applicable to the case of selecting the output of the image data decoded from three or more transport streams.

It is apparent that the present invention is not limited to the above embodiment that may be modified and changed without departing from the scope and spirit of the invention.

What is claimed is:

1. A compressed stream decoding apparatus, comprising:
   a first video data processor decoding an input first compressed video stream based on first reference time information added to the first compressed video stream, and outputting decoded video data based on the first reference time information; and
   a second video data processor performing alternatively a first processing and a second processing,
   wherein the first processing is decoding an input second compressed video stream based on second reference time information added to the second compressed video stream and outputting decoded video data based on the second reference time information, and
   wherein the second processing is outputting the decoded video data decoded by the first video data processor based on the first reference time information.

2. The compressed stream decoding apparatus according to claim 1, wherein the first video data processor outputs the video data decoded with the first compressed video stream in sync with a display synchronized signal generated using the first reference time information, and the second video data processor outputs video data decoded with the second compressed video stream in sync with a display synchronized signal generated using the second reference time information, and outputs the video data decoded with the first video data processor in sync with a display synchronized signal generated with the first reference time information.

3. The compressed stream decoding apparatus according to claim 1, wherein the second video data processor comprises a selector selecting a first decoded video data decoded by the first video data processor or a second decoded video data decoded by the second video data processor.

4. The compressed stream decoding apparatus according to claim 3, wherein an operation of circuits which perform processing from decoding the second compressed video stream to inputting the second decoded video data into the selector is stopped in case that the selector selects the first decoded video data.

5. The compressed stream decoding apparatus according to claim 1, wherein the second video data processor comprises a selector selecting the first reference time information or the second reference time information, and the second video data processor outputs video data decoded with the second compressed video stream in sync with a display synchronized signal generated with the second reference time information inputted through the selector, and outputs the video data decoded with the first video data processor in sync with a display synchronized signal generated with the first reference time information inputted through the selector.

6. The compressed stream decoding apparatus according to claim 2, wherein when the second data processor outputs the video data decoded with the first video data processor, and
wherein the display synchronized signal used by the second video processor to output the video data is synchronized with the display synchronized signal used by the first video data processor to output the video data.

7. The compressed stream decoding apparatus according to claim 1, wherein the first video data processor includes:
a first decoder decoding the first compressed video stream based on the first reference time information;
a first output buffer storing decoded video data output from the first decoder; and
a first display output unit outputting video data stored in the first output buffer in sync with the display synchronized signal generated using the first reference time information,
wherein the second video data processor includes:
a second decoder decoding the second compressed video stream based on the second reference time information;
a second output buffer storing decoded video data output from the second decoder; and
a second display output unit selecting one of the video data stored in the first output buffer and the video data stored in the second output buffer and outputting the selected video data, and
wherein the second display output unit outputs the video data stored in the first output buffer in sync with the display synchronized signal generated using the first reference time information, and outputs the video data stored in the second output buffer in sync with the display synchronized signal generated using the second reference time information.

8. The compressed stream decoding apparatus according to claim 7, wherein, when the second display output unit outputs the video data stored in the first output buffer, the display synchronized signal for the second display output unit is synchronized with the display synchronized signal for the first display output unit.

9. The compressed stream decoding apparatus according to claim 7, wherein, when the second display output unit outputs video data stored in the first output buffer, the display synchronized signal for the second display output unit is synchronized with the display synchronized signal for the first display output unit with an offset.

10. The compressed stream decoding apparatus according to claim 9, wherein the offset is an amount calculated not to cause a conflict between a video data writing operation of the first decoder with respect to the first output buffer and a video data reading operation of the second display output unit.

11. The compressed stream decoding apparatus according to claim 7, wherein the first decoder writes new video data to a storage area of the first output buffer from which the first display output unit and the second display output unit have been read video data.

12. The compressed stream decoding apparatus according to claim 1, wherein the first video data processor includes:
a first decoder decoding the first compressed video stream to output decoded video data;
a first clock generator generating a reference clock for decoding the first compressed video stream from the first reference time information;
a first output buffer storing decoded video data output from the first decoder; and
a first display output unit outputting video data stored in the first output buffer based on a display synchronized signal generated using a reference clock generated from the first clock generator,
wherein the second data processor includes:
a second decoder decoding the second compressed video stream to output decoded video data;
a second clock generator generating a reference clock based on the first reference time information or the second reference time information;
a second output buffer storing the decoded video data output from the second decoder; and
a second display output unit selecting one of the video data stored in the first output buffer and the video data stored in the second output buffer to output the selected video data, and
wherein the second display output unit outputs video data stored in the first output buffer based on the reference clock generated from the second clock generator using the first reference time information, and outputs video data stored in the second output buffer by decoding the second compressed video stream with the second decoder based on the reference clock generated with the second clock generator using the second reference time information.

13. The compressed stream decoding apparatus according to claim 12, further comprising:
a first synchronized signal generator generating a display synchronized signal used by the first display output unit to output an image, from the reference clock generated with the first clock generator; and
a second synchronized signal generator generating a display synchronized signal used by the second display output unit to output an image, from the reference clock generated with the second clock generator,
wherein, when the video data stored in the first output buffer is output to the second display output unit, the display synchronized signal generated with the second synchronized signal generator is synchronized with the display synchronized signal generated with the first synchronized signal generator with an offset.

14. The compressed stream decoding apparatus according to claim 13, wherein the offset is an amount calculated not to cause a conflict between a video data writing operation of the first decoder with respect to the first output buffer and a video data reading operation of the second display output unit.

15. A compressed stream decoding apparatus for decoding an input first compressed video stream and an input second compressed video stream in a time-division manner to output decoded video data, the apparatus adjusting, if the first compressed video stream and the second compressed video stream have different frame frequencies, a decoding start time such that a decoding start time of a picture in one of the input first or input second compressed video streams with a lower frame frequency is delayed until completion of decoding of a picture in the other video stream with a higher frame frequency.

16. A compressed stream decoding apparatus, comprising:
a decoder receiving a first compressed video stream and a second compressed video stream configured to decode the first compressed video stream and the second compressed video stream in a time-division manner to output decoded video data;
a first output buffer configured to store video data decoded with the first compressed video stream output from the decoder;
a first display output unit configured to output the video data stored in the first output buffer in sync with a display synchronized signal generated based on reference time information added to the first compressed video stream;
a second output buffer configured to store video data obtained by decoding the second compressed video stream output from the decoder; and
a second display output unit configured to select one of the video data stored in the first output buffer and the video data stored in the second output buffer to output the selected video data, the second display output unit outputting the video data stored in the first output buffer in sync with the display synchronized signal generated using the first reference time information and outputting the video data stored in the second output buffer in sync with the display synchronized signal generated using the second reference time information.

17. The compressed stream decoding apparatus according to claim 16, wherein the apparatus adjusts, if the first compressed video stream and the second compressed video stream have different frame frequencies, a decoding start time such that a decoding start time of a picture in one of the compressed video streams with a lower frame frequency is delayed until completion of decoding of a picture in the other video stream with a higher frame frequency.

18. A compressed stream decoding method, the method comprising:
decoding an input first compressed video stream based on first reference time information added to the first compressed video stream, and storing decoded video data in a first output buffer;
outputting the video data stored in the first output buffer in sync with a display synchronized signal generated using the first reference time information;
decoding an input second compressed video stream based on second reference time information added to the second compressed video stream to store decoded video data in a second output buffer; and
selecting one of the video data stored in the first output buffer and the video data stored in the second output buffer to output the selected video data from the second display output unit, the second display output unit outputting the video data stored in the first output buffer in sync with the display synchronized signal generated using the first reference time information, and outputting the video data stored in the second output buffer in sync with the display synchronized signal generated using the second reference time information.

19. The compressed stream decoding method according to claim 18, wherein, when the second display output unit outputs the video data stored in the first output buffer, the display synchronized signal for the second display output unit is synchronized with the display synchronized signal for the first display output unit.

20. The compressed stream decoding method according to claim 18, wherein, when the second display output unit outputs the video data stored in the first output buffer, the display synchronized signal for the second display output unit is synchronized with the display synchronized signal for the first display output unit with an offset.

21. The compressed stream decoding method according to claim 20, wherein the offset is an amount calculated not to cause a conflict between a video data writing operation of the first decoder with respect to the first output buffer and a video data reading operation of the second display output unit.

22. The compressed stream decoding method according to claim 19, wherein new video data is written to a storage area of the first output buffer from which the first display output unit and the second display output unit have read video data.

23. The compressed stream decoding method according to claim 18, wherein the first compressed video stream and the second compressed video stream are decoded in a time-division manner, and if the first compressed video stream and the second compressed video stream have different frame frequencies, a decoding start time is adjusted such that a decoding start time of a picture in one of the compressed video streams with a lower frame frequency is delayed until completion of decoding of a pictured in the other video stream with a higher frame frequency.

24. A compressed stream decoding apparatus, comprising:
a first compressed video processor configured to receive a first transport stream and to output a first output image, said first compressed video processor comprising:
a first decoder configured to decode the first transport stream;
a first output buffer configured to store an output of the first decoder; and
a first sync signal generator configured to output a first output clock signal based on a first system clock signal; and
a second compressed video processor configured to receive a second transport stream and to output a second output image, said second compressed video processor comprising:
a second decoder configured to decode the second transport stream;
a second output buffer configured to store an output of the second decoder;
a first selector configured to select as a selected output display signal either of contents of the first output buffer or contents of the second output buffer;
a second selector configured to select as a selected clock signal either of the first system clock signal or a second system clock signal; and
a second sync signal generator configured to generate a second output clock signal based on the selected clock signal.

25. The compressed stream decoding apparatus according to claim 24, further comprising:

a first display output unit configured to output contents of the first output buffer as the first output image based on the first output clock signal; and a second display output unit configured to output the selected output display signal based on the second output clock signal as the second output image.

26. The compressed stream decoding apparatus according to claim 25, wherein, in a case of outputting different output images, the first output image being based on the first transport stream and the second output image being based on the second transport stream, the first decoder executes decoding based on the first system clock signal and the second decoder executes decoding based on the second system clock signal.

27. The compressed stream decoding apparatus according to claim 25, wherein, in a case of the first output image being based on the first transport stream and the second output image being based on the second transport stream to a case of sending the first output image as a same output image to the first display unit and the second display unit, the second selector outputs the first system clock signal to the second sync signal generator and the first selector outputs the output of the first output buffer to the second display unit.

28. The compressed stream decoding apparatus according to claim 25, wherein, in a case of sending a same output image to the first display unit and the second display unit, the first output clock signal and the second output clock signal are placed in sync by the second sync signal generator.

* * * * *